United States Patent
Schmidt et al.

(10) Patent No.: US 11,193,603 B2
(45) Date of Patent: Dec. 7, 2021

(54) PRESSURE RELIEF VALVE

(71) Applicant: Melissa Bowyer, Tulsa, OK (US)

(72) Inventors: Curtis Schmidt, Broken Arrow, OK (US); James R. Kerian, Broken Arrow, OK (US); Johnny Bowyer, Broken Arrow, OK (US)

( * ) Notice: Subject to any disclaimer, the term of this patent is extended or adjusted under 35 U.S.C. 154(b) by 0 days.

(21) Appl. No.: 16/460,069

(22) Filed: Jul. 2, 2019

(65) Prior Publication Data
US 2020/0018410 A1     Jan. 16, 2020

Related U.S. Application Data

(60) Provisional application No. 62/694,814, filed on Jul. 6, 2018.

(51) Int. Cl.
*F16K 17/06* (2006.01)

(52) U.S. Cl.
CPC .................. *F16K 17/06* (2013.01)

(58) Field of Classification Search
CPC ..... F16K 17/06; F16K 17/196; Y10T 137/773
USPC .......................................................... 251/73
See application file for complete search history.

(56) References Cited

U.S. PATENT DOCUMENTS

| 1,196,318 A | * | 8/1916 | Waddell, Jr. | ............ F16K 17/00 137/463 |
| 1,433,416 A | * | 10/1922 | Reed | .................. G05D 16/0663 137/463 |
| 2,806,484 A | * | 9/1957 | Schultz | ................... F16K 17/32 137/460 |
| 5,183,115 A | * | 2/1993 | Gano | ...................... E21B 23/02 137/460 |
| 8,607,818 B2 | | 12/2013 | Monroe et al. | |
| 2005/0264100 A1 | | 12/2005 | Enerson | |
| 2015/0285391 A1 | | 10/2015 | Rickis et al. | |
| 2016/0084246 A1 | | 3/2016 | Dole et al. | |

FOREIGN PATENT DOCUMENTS

EP         1431637 A1     6/2004

* cited by examiner

*Primary Examiner* — Reinaldo Sanchez-Medina
*Assistant Examiner* — Nicole Gardner
(74) *Attorney, Agent, or Firm* — Chad Hinrichs

(57) ABSTRACT

A pressure relief valve with a trigger mechanism having a plurality of tines on the ejector which engage with a fixed stop. The tine ends and/or the fixed stop are chamfered. The valve opens when the force from the contained fluid exceeds the force of the spring plus the force necessary to move the tines out of alignment with the fixed stop. The trigger pressure of the valve can be adjusted by adjusting the geometry of the tines. This is accomplished by using interchangeable tine sections on the ejector. Pressure is contained by a primary seal located on the outer diameter of the ejector.

13 Claims, 5 Drawing Sheets

PRESSURE RELIEF VALVE

PRIORITY CLAIM

The present application claims the priority of and is a continuation-in-part of U.S. Provisional Patent Application No. 62/694,814 titled "Improved Pressure Relief Valve" filed on Jul. 6, 2018. The Provisional Application No. 62/694,814 is incorporated herein by reference.

FIELD OF THE INVENTION

The present invention relates generally to a pressure relief valve. More particularly, the present invention relates to an improved operating mechanism for a pressure relief valve.

BACKGROUND OF THE INVENTION

Pressure relief systems are used to protect pressure vessels and piping systems from overpressure. They allow the release of pressure and fluid from the system when a predetermined set pressure is reached. Pressure relief systems are the last line of defense against a serious overpressure incident. If left unchecked the overpressure of a system can cause a catastrophic rupture, explosion and/or fire. This in turn can cause the loss of life and property. The pressure relief system is generally a single device that is intended to protect against multiple potential overpressure scenarios. Therefore, proper design, specification, installation, maintenance and testing are critical if the relief system is to fulfill its proper place in the layers of overall safety protection.

Pressure relieving devices are categorized into two types in the American Society of Mechanical Engineers' pressure code, often referred to as the ASME code. Pressure relief devices are found under the ASME:UD provisions. They typically open immediately once a set pressure is reached. This is accomplished through the destruction of one of its components such as a rupture disk, buckling pine or shear pin. The pressure relief device typically has an inlet and an outlet which are in-line with one another. Once they have been triggered, the disk or pin must be manually replaced before restarting the system.

Pressure relief valves are found under ASME:UV of the ASME code. They include safety valves, relief valves and pilot operated valves which typically open gradually once the set pressure is reached. Once the pressure of the system drops below the set pressure, they reclose on their own without replacing any parts.

The problem pressure relief valves have is that the set pressure at which they open is the same pressure at which they close. The system they are protecting can oscillate above and below this set pressure repeatedly. This causes the pressure relief valve to oscillate between open and closed. Under certain circumstances this can happen in a rapid and violent fashion causing damage to the system being protected and the pressure relief valve.

What is needed is a pressure relief valve with a simple mechanism which opens at one set pressure and closes at a second lower set pressure. Thus, avoiding the rapid opening and closing of the pressure relief valve.

Further what is needed is a pressure relief valve where the opening and closing set pressures can be readily changed.

BRIEF SUMMARY OF THE INVENTION

The present invention is a pressure relief valve with a trigger mechanism having a plurality of tines on the ejector which engage with a fixed stop. The tine ends and/or the fixed stop are chamfered. There is a spring mechanism which biases the ejector towards the closed position. The valve opens when the force on the ejector from the contained fluid exceeds the force of the spring plus the force necessary to move the tines out of alignment with the fixed stop.

Once in the ejector is in the open position, a second surface of the tines come into contact with the fixed stop. The angle of this second surface provides a bias to keep the ejector in the open position. The ejector is held in the open position by the continuing pressure of the contained fluid and the interaction between the second surface of the tine and the fixed stop. The ejector will return to the closed position once the force of the spring mechanism on the ejector exceeds the biasing force of the second surface of the tine on the fixed stop plus the force of the pressure of the system on the ejector. Thus, the set pressure to open the valve is greater than the set pressure to close the valve. This difference between the opening set pressure and the closing set pressure prevents the valve from rapidly cycling between open and closed.

The pressure relief valve of the present invention is constructed so the tines can be removed from the ejector. Thus, the trigger pressure of the valve can be adjusted by changing the geometry of the tines. Pressure is contained by a primary seal located on the outer diameter of the ejector. A secondary seal is located on the outer diameter of the ejector above the valve outlet. When the seal is in the open position the secondary seal provides a seal between the ejector and the valve body which prevents the contained fluid from coming in contact with the trigger mechanism.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE INVENTION

Figure 1:
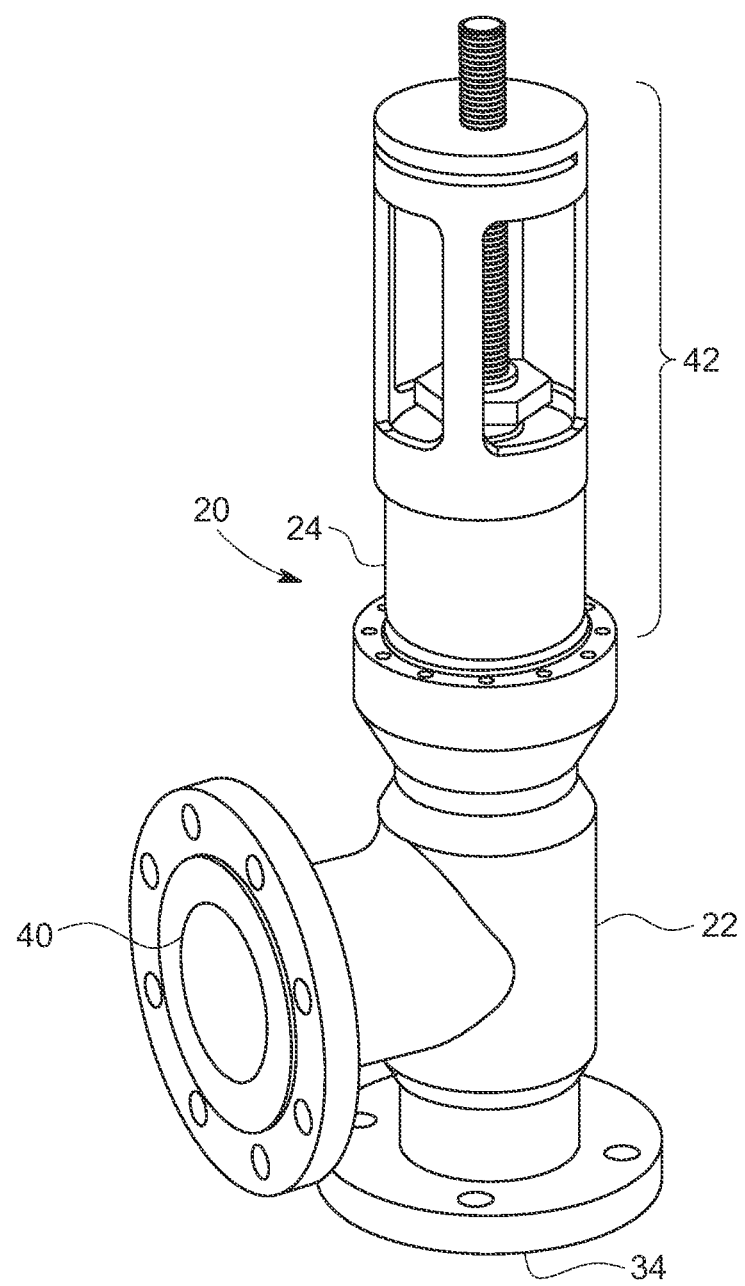
FIG. 1 is a perspective view of a pressure relief valve of the present invention installed in a 90 Degree fitting.
Figure 2:
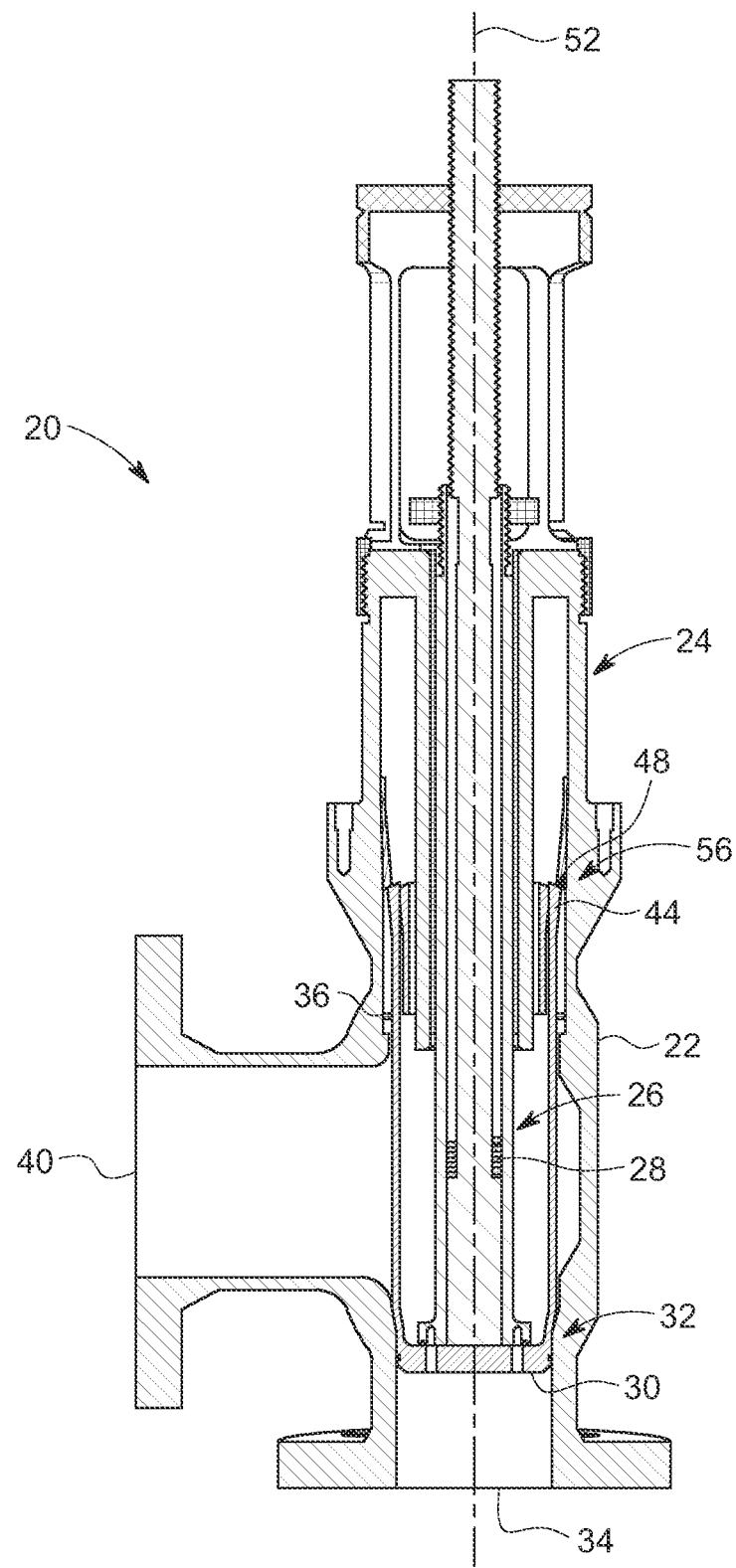
FIG. 2 is a cross sectional view of the valve in FIG. 1 in the closed position.
Figure 3:
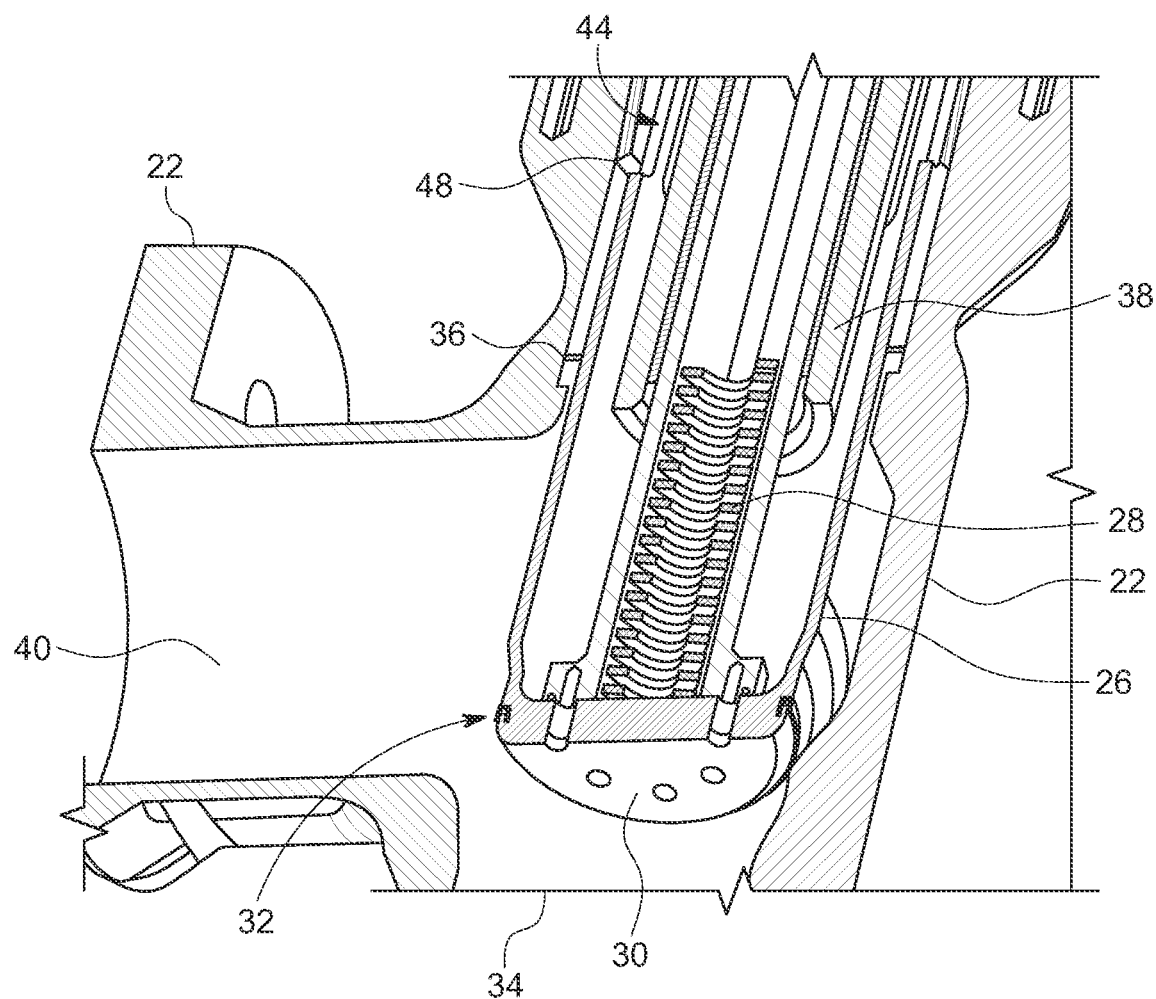
FIG. 3 is a close up of the ejector of the valve in FIG. 1 in the open position.
Figure 4:
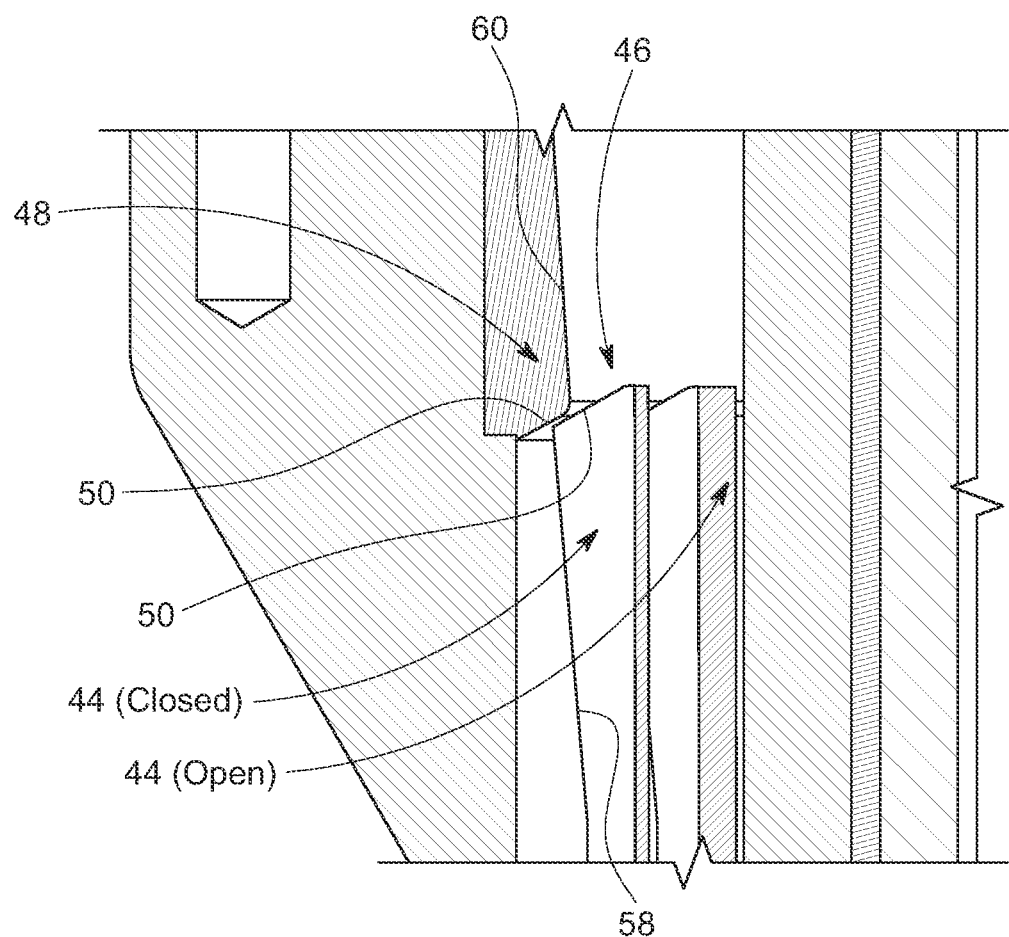
FIG. 4 is a close up of the ejector fins engaged with the valve insert in the closed position.
Figure 5:
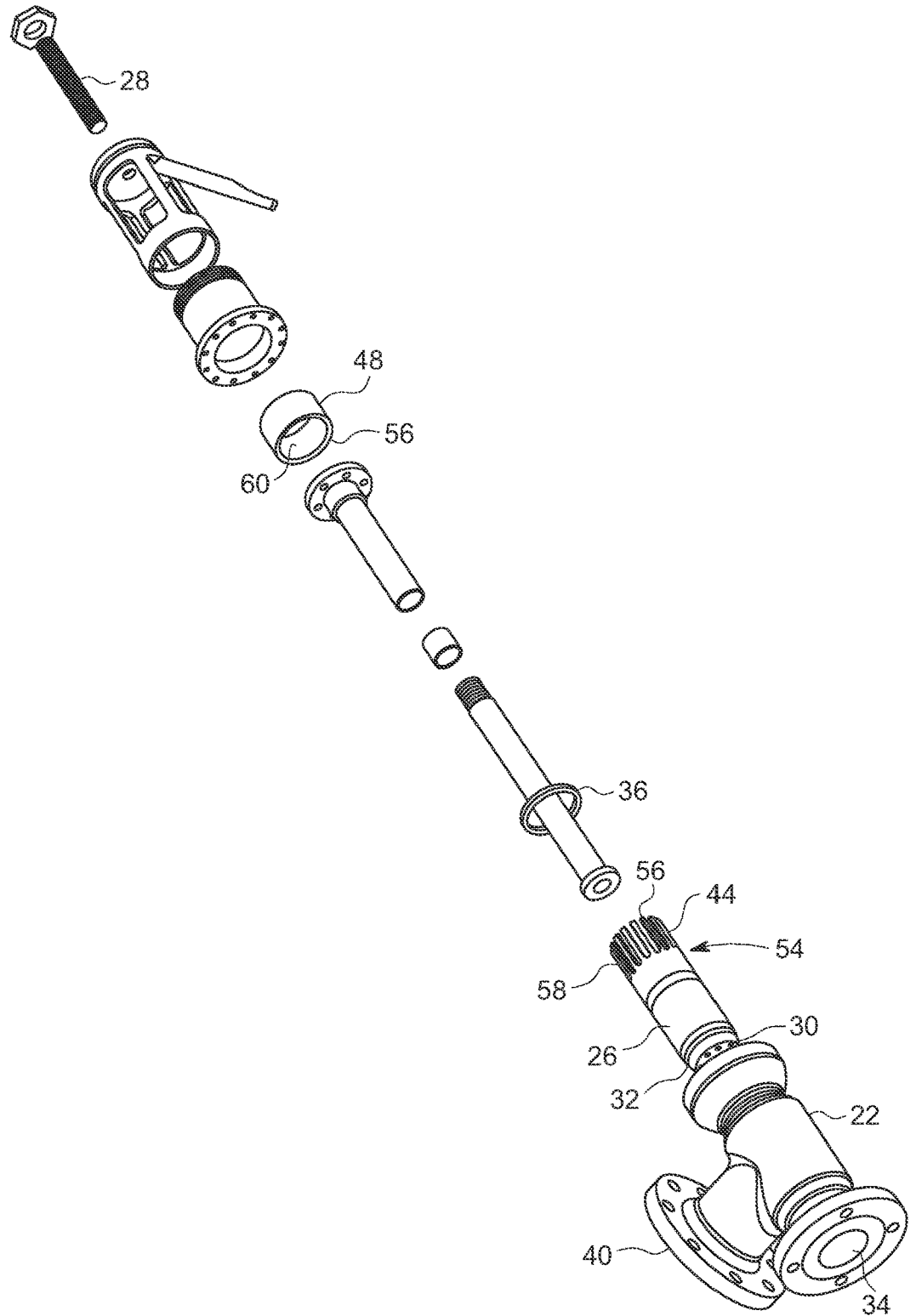
FIG. 5 is an exploded view of the valve.

Turning now to the drawings wherein like reference characters indicate like or similar parts throughout, FIG. 1 provides a prospective view of the preferred embodiment of pressure relief valve 20 of the present invention. FIGS. 2 and 4 provide cross sections of various portions of the preferred embodiment of the present invention in the closed position. FIG. 3 provides a cross section view of the preferred embodiment of the present invention in the open position. An exploded view of the preferred embodiment of the present invention is seen in FIG. 5.

The pressure relief valve 20 as seen in the Figures is installed in a right-angle fitting 22. The valve body 24 is secured to the right-angle fitting 22. The ejector 26 moves relative to the valve body 24 and within the fitting 22. A spring mechanism 28 biases the ejector 26 away from the valve body 24 and towards the closed position. There is an ejector cap 30 located on the bottom of the ejector 26. In the closed position a primary seal 32 on the ejector cap 30 and/or outer diameter of the ejector 26 seals the inlet of the fitting 22, i.e. provides a seal between the ejector 26 and the fitting 22. This contains the fluid in the pressure lines being protected from over pressure. This allows the seal 32 to initially hold the pressure as the valve 20 opens.

A secondary seal 36 is located on the outer diameter 38 of the ejector 26. In the closed position it is located above the fitting outlet 40. The secondary seal 36 provides a seal between the ejector 26 and the fitting 22 above the fitting outlet 40 once the valve 20 opens. This keeps the pressure-controlled fluid out of the trigger mechanism 42 of the pressure relief valve 20.

The trigger mechanism 42 has a plurality of tines 44 which extend from the ejector 26. The ends 46 of these tines 44 engage a fixed stop 48 in the valve body 24. At least one of the fixed stops 48 or the tine ends 46 have a chamfer 50 which is angled upward towards the centerline 52 of the valve 20. In the preferred embodiment both the fixed stop 48 and the tine ends 46 have chamfers 50 cut on complementary angles to one another.

The opening pressure of the pressure release valve 20 can be altered by altering the geometry of the tines 44. Each of the tines 44 function as a cantilever beam. Short tines 44 are more rigid and thus increase the opening pressure of the valve 20 versus longer tines 44. Similarly, wide tines 44 are more rigid than narrow tines 44 and will increase the opening pressure compared to narrower tines 44. Opening pressure can also be increased by changing the angle of the chamfer 50 and/or by increasing the friction coefficient of the surface of the chamfer 50.

The changing of tines 44 is facilitated by having a tine section 54 which is removable from the ejector 26. In the preferred embodiment the tine section 54 threadedly engages with the ejector 26. Thus, the trigger pressure can be changed by changing out the tine section 54 on the ejector 26.

As the force from the pressure of the contained fluid increases, the tines 44 are forced along the chamfered surface(s) 56 inward towards the centerline 52 of the valve 20. When the pressure and the resulting upward forces are great enough the tines 44 will move inward allowing the tine ends 46 to pass over the fixed stop 48. In order to open the pressure relief valve 20, the force of the contained fluid on the ejector cap 30 must be greater than the force needed to move the tine ends 46 past the fixed stop 48 plus the force exerted by spring mechanism 28 on the ejector 26.

Once in the open position the ejector 26 is held open by the force of the contained fluid exerted on the ejector cap 30 and the force exerted by the second surface 58 of the tine 44 on the second surface 60 of the fixed stop 48. In order for the valve 20 to return to the closed position the force exerted by the spring mechanism 28 must exceed the force of the contained fluid exerted on the ejector cap 30 plus the force exerted by the second surface 58 of the tine 44 on the second surface 60 of the fixed stop 48. As best seen in in FIG. 4, in the preferred embodiment the second surface 58 of the tine 44 and the second surface 60 of the fixed stop 48 are at much smaller angle to the center line 52 of the valve 20 than the angle of the chamfered surfaces 56 of the tines 44 and fixed stop 48. Thus, the set pressure to open the pressure relief valve 20 is greater than the set pressure to close the pressure relief valve 20. This difference in opening and closing set pressure prevent the pressure relief valve 20 from rapidly cycling open and closed.

The valve 20 of the present invention can be installed in numerous orientations. However, for ease of discussion the application uses the orientation of the valve 20 being installed with the inlet 34 at the bottom. This allows for use of the terms up, down, above, below, etc. to be used to explain the various parts and operation of the valve 20. This should not be interpreted as a limitation of the valve 20 itself.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A pressure relief valve for protecting a system from overpressure of a fluid, the valve comprising:
    a valve body mounted on a fitting, the fitting having an inlet and an outlet;
    an ejector with a cap;
    a primary seal located on the ejector cap and a secondary seal located on an outer diameter of the ejector;
    a trigger mechanism with a plurality of tines attached to the ejector and a fixed stop attached to the valve body;
    a valve centerline;
    a spring mechanism;
    the tines each having a chamfered surface which contacts the fixed stop when the ejector is in the closed position; and
    a chamfered surface on the fixed stop which contacts the chamfered surfaces of the tines when the ejector is in the closed position; wherein the ejector is located in the fitting and is moveable between a closed position where the primary seal provides a seal between the fitting inlet and the ejector and an open position where the secondary seal provides a seal between the valve body and the ejector.

2. The pressure relief valve of claim 1 further comprising:
    the seal between the secondary seal and the valve body prevent a contained fluid from contacting the trigger mechanism when the ejector is in the open position.

3. The trigger mechanism of claim 1 further comprising:
    the chamfered surface of the fixed stop is complementary to the chamfered surfaces of the tines.

4. The trigger mechanism of claim 1 further comprising:
    the pressure relief valve having a set pressure to open and a set pressure to close;
    wherein the set pressure to open is greater than the set pressure to close.

5. The trigger mechanism of claim 1 further comprising:
    the tines having a second surface which contacts the fixed stop when the ejector is in the open position.

6. The trigger mechanism of claim 5 further comprising:
    the spring mechanism biasing the ejector towards the closed position; and
    the second surface of the tines biasing the ejector towards the open position.

7. The trigger mechanism of claim 6 further comprising:
    the pressure relief valve having a set pressure to open and a set pressure to close;

wherein the set pressure to open is greater than the spring force needed to reclose the valve.

8. A pressure relief valve for protecting a system from overpressure of a fluid, the valve comprising:
   a valve body mounted on a fitting, the fitting having an inlet and an outlet;
   an ejector with a cap;
   a primary seal located on the ejector cap and a secondary seal located on an outer diameter of the ejector;
   a trigger mechanism with a plurality of tines attached to the ejector and a fixed stop attached to the valve body;
   a valve centerline; and
   a spring mechanism;
   wherein the ejector is located in the fitting and is moveable between a closed position where the primary seal provides a seal between the fitting inlet and the ejector and an open position where the secondary seal provides a seal between the valve body and the ejector and the tines threadedly engage the ejector.

9. The pressure relief valve of claim 8 further comprising:
   the seal between the secondary seal and the valve body prevent a contained fluid from contacting the trigger mechanism when the ejector is in the open position.

10. The trigger mechanism of claim 8 further comprising:
    the pressure relief valve having a set pressure to open and a set pressure to close;
    wherein the set pressure to open is greater than the set pressure to close.

11. The trigger mechanism of claim 8 further comprising:
    the tines having a second surface which contacts the fixed stop when the ejector is in the open position.

12. The trigger mechanism of claim 11 further comprising:
    the spring mechanism biasing the ejector towards the closed position; and
    the second surface of the tines biasing the ejector towards the open position.

13. The trigger mechanism of claim 12 further comprising:
    the pressure relief valve having a set pressure to open and a set pressure to close;
    wherein the set pressure to open is greater than the spring force needed to reclose the valve.

* * * * *